United States Patent [19]

Nolan

[11] Patent Number: 5,809,500
[45] Date of Patent: Sep. 15, 1998

[54] SYSTEM FOR CONVERTING PROGRAMS AND DATABASES TO CORRECT YEAR 2000 PROCESSING ERRORS

[75] Inventor: Daniel A. Nolan, Annandale, Va.

[73] Assignee: Century Technology Services, Inc., McLean, Va.

[21] Appl. No.: 879,613

[22] Filed: Jun. 20, 1997

Related U.S. Application Data

[60] Provisional application No. 60/038,907 Feb. 26, 1997.

[51] Int. Cl.[6] .................................................. G06F 17/30
[52] U.S. Cl. ............................................... 707/6; 707/102
[58] Field of Search ......................................... 707/102, 6

[56] References Cited

U.S. PATENT DOCUMENTS

| | | | |
|---|---|---|---|
| 5,600,836 | 2/1997 | Alter | 707/101 |
| 5,630,118 | 5/1997 | Shaughnessy | 707/1 |
| 5,668,989 | 9/1997 | Mao | 707/101 |
| 5,719,826 | 2/1998 | Lips | 368/29 |
| 5,737,735 | 4/1998 | Soeder | 707/6 |

OTHER PUBLICATIONS

The Year 2000 and 2–Digit Dates: A Guide for Planning and Implementation, 3rd ed., IBM, May 1, 1996.

*Primary Examiner*—Wayne Amsbury
*Attorney, Agent, or Firm*—Kile McIntyre & Harbin

[57] ABSTRACT

A method for processing or modifying programs and databases containing abbreviated date fields to achieve year 2000 compliancy includes examining an original database to ascertain the location of date fields, creating a supplementary PALM file that includes fully expanded date fields representative of corresponding date fields in the original database and modifying instructions or modules of the original program to access the PALM file for date information instead of the original database. The PALM file contains fully expanded date representations of abbreviated date fields of the original database. The PALM file also includes record identifiers and field identifiers to enable the modified program to access the required date information. Portions of the program requiring modification are identified by scanning for keywords that are generated from an examination of the database and/or from field layout definitions. The program is also examined for related keyword constructs or redefinitions found in the program itself. When converted, the modified program accesses the PALM file for date processing and accesses the original database for other processing steps. The method enables a computational system to determine the periods between dates in a non-ambiguous manner and yet advantageously uses the original database to retain system compatibility.

17 Claims, 6 Drawing Sheets

FIG. 1

INTERIM TABLE OF RESULTS

| Name | Null | NonDate | YYMMDD | DDMMYY | MMDDYY |
|------|------|---------|--------|--------|--------|
| FLD1 | 11 | 908 | | | |
| FLD2 | 1 | | | | |
| FLD4 | | | | 991 | |
| FLD1 | 7 | 2 | | | |
| FLD2 | | | 298 | | |

FIG. 2A

FINAL REPORT FOR A FILE

| Name | Null | NonDate | YYMMDD | DDMMYY | MMDDYY |
|------|------|---------|--------|--------|--------|
| FLD1 | 90 | 910 | | | |
| FLD2 | 110 | | 890 | | |
| FLD3 | 110 | 900 | 5 | 4 | 1 |
| FLD4 | | | | 1000 | |
| FLD5 | | 1000 | | | |
| FLD6 | | | 1000 | | |

FIG. 2B

| | Julian | YYMMDD | MMDDYY | DDMMYY | YYMM | Non-Date |
|---|---|---|---|---|---|---|
| NAME | | | | | | 1000 |
| DOB | | 1000 | 14 | | | |
| ADDRESS | | | | | | 1000 |
| SSN | 13 | 22 | 144 | 111 | 601 | 891 |
| ZIP | 22 | 44 | 11 | 11 | | 930 |
| HIRED | | 994 | | | | 6 |
| DEPT | 2 | | | | 202 | 796 |
| XFER | | 721 | 11 | | | |
| TERM | | 33 | | | | 967 |

Table 1, Date Types

FIG. 3

PROGRAM EXAMINATION PROCESS

SYSTEM FOR CONVERTING PROGRAMS AND DATABASES TO CORRECT YEAR 2000 PROCESSING ERRORS

CROSS-REFERENCE TO RELATED APPLICATION

This application is a continuation of U.S. provisional application no. 60/038,907 filed on Feb. 26, 1997 titled System for Year 2000 Data Conversion in the name of Daniel A. Nolan, incorporated herein. Priority is claimed under 35 U.S.C Sec. 119(e).

FIELD OF THE INVENTION

The present invention pertains to methods and systems for removing processing ambiguities in computing systems that process dates having values beyond the year 2000. More specifically, the invention concerns a method of examining, modifying and supplementing non-compliant computer programs and databases to permit their continued use beyond the year 2000.

BACKGROUND OF THE INVENTION

The approaching millennium presents a challenge to the continued use and viability of existing programs and database systems. Despite introduction of more recent computing systems, these so called "legacy" systems continue to perform valuable functions and, as such, users continue to invest significant time and resources to maintain them. One reason is to avoid the great expense, inconvenience or disruption encountered to obtain suitable replacement.

Continued use of legacy systems beyond the year 2000 presents a particular problem. Many data and software structures of these older programs use abbreviated date fields, that is, date fields consisting of six characters to represent day/month/year, instead of the eight characters found in a non-abbreviated date field of more recent software systems that reflect the century. For example, the date Nov. 17, 1972 is designated as 11/17/1972 in a non-abbreviated date field format such as MM/DD/YYYY. By contrast, that date in an abbreviated format of MM/DD/YY would be 11/17/72, i.e., without designation of century. In other words, typical legacy systems experiencing the "year 2000 dilemma" are those in which two instead of four characters represent the year.

In calculating periods between respective dates in abbreviated formats, non-compliant systems simply subtract the earlier date from the later date to yield a result. For instance, in determining the number of years between 1949 and the year 1988, "49" is subtracted from "88" to correctly yield "39" years. A correct result is obtained so long as the year elements involved in the calculation represent the same century. Ambiguities arise when the calculation involves data elements of different centuries, such as, when determining the period between 1988 and 2002. The absolute value of subtracting abbreviated elements "1988" and "02" erroneously yield "86" years, instead of 14 years. Programs using such algorithms are said to be "non-compliant" with the year 2000.

One solution for "fixing" non-compliant programs, known as "expansion," involves altering date fields of a database by expanding their two-character year fields to four characters to indicate the century. In this way, subtracting "1988" from "2002" correctly yields "14" years. In addition, expansion of date fields often engenders compatibility problems due to a change in record size. In particular, the required recompilation of affected routines in the computing system relative to the "expanded" database segment may affect the ability of other routines that access the same database. Accordingly, expansion places a tremendous burden of conversion of the entire system, or necessitates the development of software bridges to enable communication between compliant and non-compliant portions of the computing system. Re-writing code to convert programs is time-consuming due to debugging and testing requirements. In some instances, it may also require a substantial amount of downtime. Developing software bridges is also time and labor intensive, requiring massive testing and increased processing time.

"Windowing" is another solution to attaining year 2000 compliance. It is less costly and involves identifying the century prefix for a date field assuming a fixed period of time typically, 20 to 50 years, before performing any calculation. This technique has limited applications and, at best, is only a temporary fix since it may disturb other algorithms in the computing system. Establishing a "19" or "20" century prefix by windowing requires establishing a predetermined time window based on a presumption that the values of date elements fall within a predetermined window. However, "windowing" is not reliable because it is based on information that is not constant as years pass, causing the need to redefine the window from time-to-time.

In view of the foregoing, it is therefore an objective of the present invention to provide an improved method and system for enhancing computer programs and databases to achieve year 2000 compliancy.

It is a further objective of the present invention to provide an automated process of modifying or enhancing computational systems for achieving year 2000 compliancy, thereby lessening the time, cost and manpower effort.

It is a further objective of the present invention to minimize the disruption of converting computational systems for achieving year 2000 compliancy that would otherwise be experienced using expansion or windowing techniques.

It is yet a further objective of the present invention to maintain system wide database integrity of computational systems by preserving the original database and yet still achieve the accuracy of expansion techniques.

It is yet a further objective of the present invention to provide a process of examining source code and databases for determining whether, and how much, they must be enhanced to achieve year 2000 compliancy.

It is another objective of the present invention to provide an auxiliary file for processing or handling date information externally of and without disturbing the original database, and to provide a method for scanning, searching and identifying date fields within a database for creating the auxiliary file.

SUMMARY OF THE INVENTION

According to the present invention, a method for enhancing or modifying a program and an associated database having abbreviated date fields to achieve year 2000 compliancy comprises examining the database to ascertain the identity and location of abbreviated representations of dates and, based on the results of said examining, creating an auxiliary file that contains expanded representations of dates that correspond to said abbreviated representations of dates identified and located in said database. Then, the method further includes modifying said program so that instructions that referenced said database to access abbreviated representations of dates are altered to reference corresponding expanded representations of dates in said auxiliary file whereby to remove processing ambiguities involving date representations and to enable continued use of said original database with respect to other database information.

In addition, a year 2000 compliant computational system is provided that comprises a modified program, an original database and an auxiliary database file wherein the original database includes multiple records that include record IDs and date fields having abbreviated date information, the auxiliary database file includes multiple records having record IDs with a field in each record identified as to the original file, and that correspond with the record IDs of the original database with at least one field having fully expanded date information indicative of corresponding date information in the original database, and the modified program includes an original non-compliant program that has been modified to access the auxiliary database file in accordance with corresponding record IDs instead of accessing the original database to obtain date information.

In another embodiment, the method includes identifying program modules requiring modification or enhancement, creating a supplementary database file (i.e., a PALM file) having fully expanded date fields that are associated with corresponding date fields of the original database, developing a cross-reference between the contents of an original database and the PALM file relative to date field references in the program modules, and embedding auxiliary instructions in identified program modules that redirect references from the original database to the PALM file for determination of periods between dates in a non-ambiguous manner.

The process permits retaining the original database and requires minimal modification of only those source code modules that reference the date field of the original database.

In a preferred embodiment of the invention relative to the database, the method includes analyzing and/or sampling segments of the database to identify the field location or layout of pertinent date fields, ascertaining labels or field names associated with respective field locations, and creating an auxiliary database file (i.e., a PALM file) having fully expanded date fields corresponding to identified date fields of the original database. Abbreviated date fields are expanded to an eight-character Gregorian format or a seven-character Julian format. The names of fields in database records, i.e., labels or tags, are ascertained by tracing references to the respective fields back to the source code modules that reference them.

In a preferred embodiment of the invention relative to the source code, the method comprises identifying and extracting modules that call date fields, developing a cross-reference table that correlates respective contents of the original database with the PALM file using file identifiers and record identifiers, inserting patch code into the identified software modules utilizing the cross-reference table to reference PALM file contents instead of the original database to perform date calculation, recompiling the source code modules, and combining recompiled source code with other undisturbed modules to reconstruct the entire computational system thereby to attain a system having year 2000 compliancy.

Another aspect of the invention concerns automatically identifying fields in a database that represent dates. For example, to locate and identify date fields in the six-character format YYMMDD, a database is scanned to locate two-digit month fields having numbers between one and twelve, two-digit day fields following the month field having a value between one and thirty-one, and two-digit year fields preceding the month field having a number between one and ninety-nine. Numbers may be altered to account for months with less than thirty-one days.

Other aspects, advantages and features of the invention will become more readily apparent upon review of the following specifications, drawings and claims. The invention, though, is pointed out with particularity by the appended claims.

DESCRIPTION OF ILLUSTRATIVE PROCESSES

Figure 1:
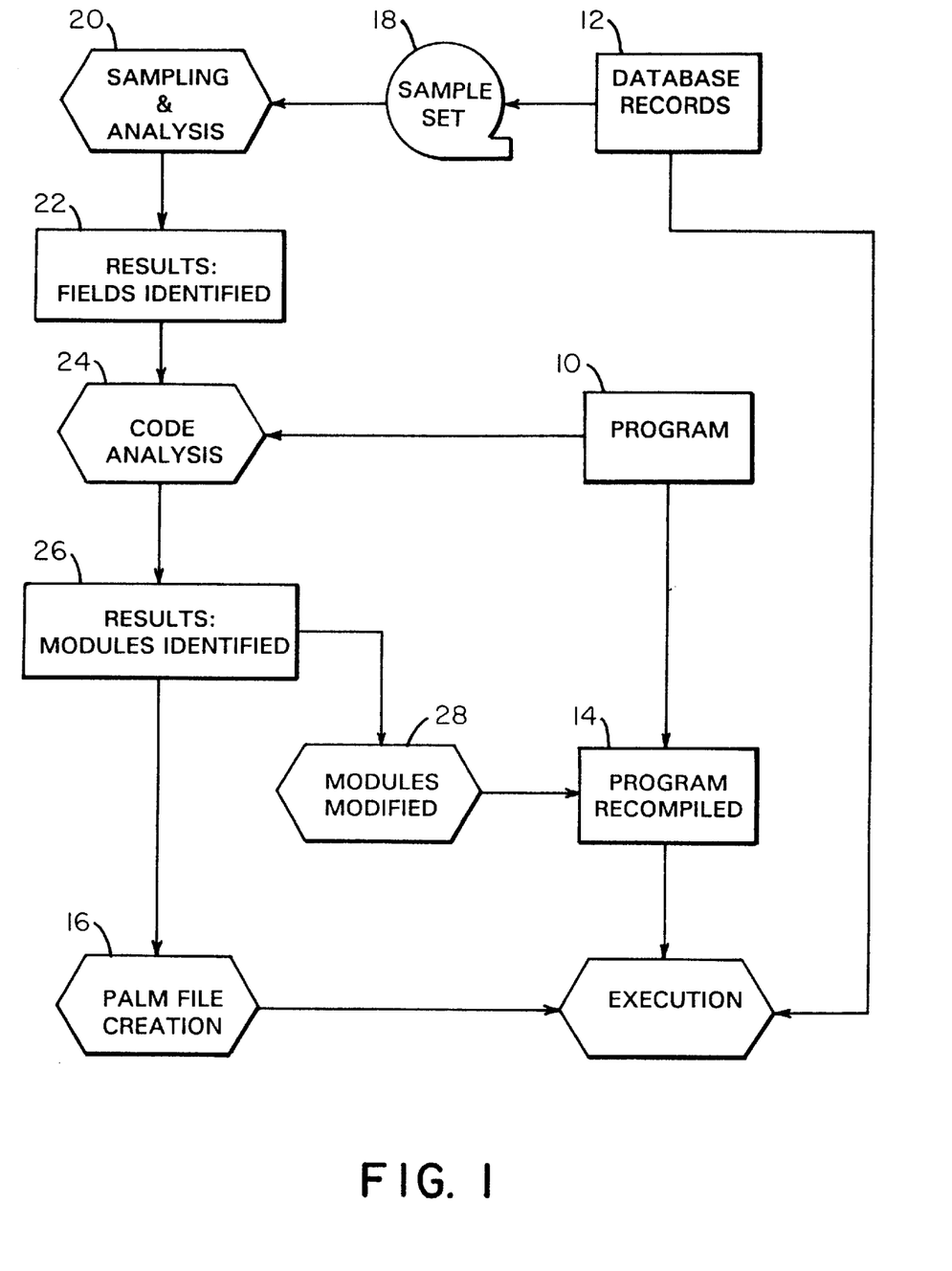
FIG. 1 is a flow diagram depicting various stages of processing a computer program and database to achieve year 2000 compliancy in accordance with the present invention.

With reference to FIG. 1, computer program 10 and database 12 are processed in accordance with automated procedures to produce a modified version 14 of the program 10. As known in the art, program 10 comprises a multitude of program modules, i.e., routines, functions and procedure calls, libraries, etc., while database 12 comprises a multitude of records, typically millions of records. Because date entries in database 12 are abbreviated and yield ambiguous results when called for use in a date or time period calculation, it is deemed non-compliant.

Automated procedures described herein are augmented with individual expert analyses to refine the conversion process in accordance with the nature and character of database 12 and/or unique rules or circumstances under which programming system 10 operates. Further, the inventive procedures may be applied to programs and databases of any language.

A date entry, as more fully explained herein, resides in one or more fields of records that make up the database. Date entries in non-compliant database 12 are abbreviated, whereas data entries in associated PALM file 16 are fully expanded. The modified version 14 of the program uses the PALM file and differs from original program 10 in that instructions in the original program that make reference to non-compliant date entries in database 12 are altered so that they make reference to compliant date entries in PALM file 16. Specifically, instructions of original program 10 are modified to redirect their calls for date entries from original database 12 to a new created PALM file 16. Upon recompilation and execution, modified program 14, which also contains unmodified modules having instructions that call non-date entries in the original database 12, then acts upon the original database 12 during calls for non-date database entries and upon a newly created PALM file 16 during calls for fully-expanded date entries.

PALM file 16 is created based on analyses of original database 12 and program 10. As earlier suggested, creating a PALM file having date entries indicative of original database contents advantageously preserves operational compatibility with unmodified program modules. By definition, a PALM file contains fully expanded eight-character (eight-digit Gregorian format) date fields, or the like (e.g., seven-digit Julian format), associated with corresponding six-character, abbreviated date fields of the original database 12. In creating the PALM file 16, record numbers, tags, pointers or the like are carried through to the PALM file during the process of replicating the original date field to expanded entries. In the case where multiple database files are employed, file names are also carried to the respective associated PALM files.

In this way, the modified computational system achieves year 2000 compliancy for date calculations and yet retains its compatibility with other parts of the original, non-expanded database relating to non-date related information. Moreover, conversion for large programming systems is relatively expeditiously achieved since only certain modules of program 10 require modification to redirect their database calls.

Database Analysis

Still referring to FIG. 1, the inventive procedure includes extracting a sample set 18 of records, e.g., 1000 records, from original database 12 for determining the record structure and field location of date entries in those records. Samples are taken from various and multiple locations in the database to confirm the determination. In the analysis stage 20, a list of field identifiers 22 is generated based on the probability that identified fields match a set of date characters. Numerals are embraced by the term "characters." Identification and analysis of records and fields is facilitated by the use of automatic scanners, data dictionaries and some basic rules about the database. Very often, fields within database records contain field names or identifiers, field layout charts are readily available, documentation is available that describe the data structure or programming conventions employed readily dictate the file and data structure. The invention entails utilizing this and other available information in the analysis stage 20. After date fields are located, the conversion procedure entails tracing the identified field back to references in the source code to confirm their identity.

In accordance with an important aspect of the invention, file layouts are verified by examining representative samples of actual database records in cases where documented information cannot confirm date field locations. This aspect of statistical sampling determines the presence of dates by assessing non-zero numbers that represent meaningful date occurrences. Known and unknown fields may be overlaid with a mask to enhance the database examination process. In accordance with known rules, customized programs may also be generated to examine the contents of fields for anticipated date characteristics such as, numeric pairs corresponding to a month, day bounded by a year; two or three pairs of digits possibly separated by punctuation; one pair of digits with the proper day for the other pairs month value; and Julian, corresponding to DD following YY.

A date is detected, for example, when a field contains character patterns such as 99/99/99 or 99-99-99; a two character field with values of 01–12; two characters, immediately before or after, contain values of 01–31; two characters immediately before or after four characters identified as a month/day combination are numeric, or a date, rearranged to YYMMDD, passes elementary month/day tests.

A matrix consisting of possible date categories of Julian, Gregorian, and none (not a date) is prepared for each file. The processing required to generate these matrices may include moving the field to the examination area, examining the field, adding information to the matrix when dates are located, repeating the processing with the next field, and repeating the process for all records in the database. The sampling process is implemented in representative samples of files, typically in sets of 1000 records. Each field is processed against rules that categorize the contents according to the type of date the field may contain. Examples of these categories are Non-date, YYMMDD, YYDDD, MMDDYY, MM/DD/YY, YYMM, and YY-MM-DD.

Figure 2A:
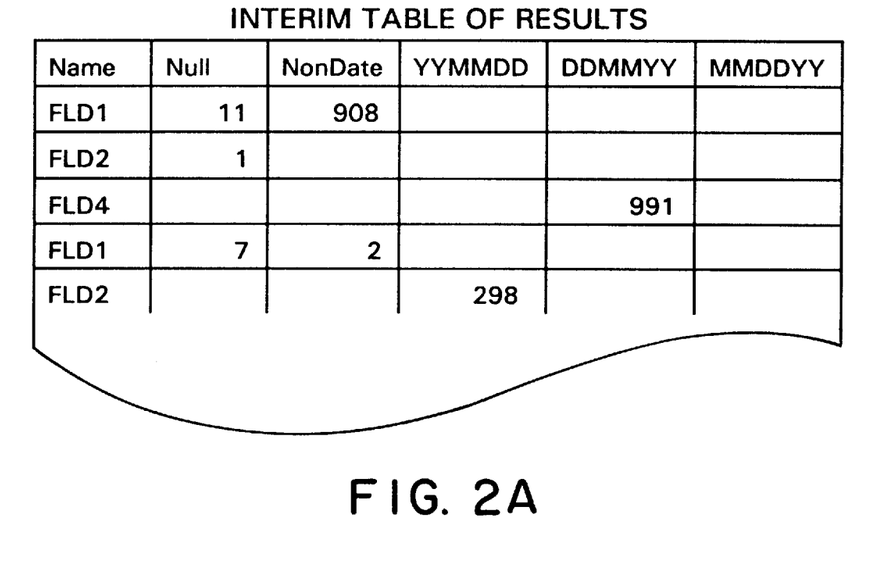
FIGS. 2A and 2B depict interim and final matrices that depict results of examining respective fields of records in an original database of a non-compliant computational system that are useful for identifying which fields represent dates.
Figure 2B:
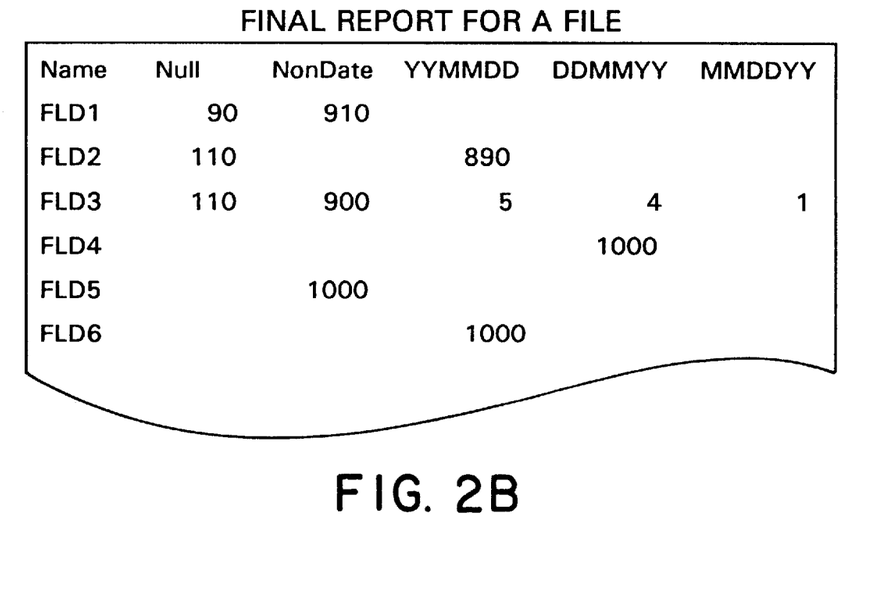

FIGS. 2A and 2B depict interim and final results of an exemplary analysis of fields of sample set 18 of 1000 records. In this analysis, the location and identity of date fields in the format DDMMYY was obtained by scanning sample set 18 to locate (i) two-digit month fields having numbers only from the set 01–12, (ii) two-digit year fields following the month field located in step (i) having numbers only from the set 01–99, and (iii) two-digit day fields preceding the month field located in step (i) wherein the day fields have the values 01–31 for month field values of 01, 03, 05, 07, 08, 10 and 12, or 01–30 for month field values of 04, 06, 09, and 11, or 01–29 for month field values of 02 for a leap year, or 01–28 for month field values of 02 for a non-leap year.

By way of illustration, to locate and identify date fields in the format DDDYY, the sample set 18 is scanned to locate (i) three-digit day fields having numbers from 01–365 for a non-leap year or 01–366 for a leap year, and (ii) two-digit year fields following the day field located in step (i) wherein the year fields have the values only from the set 01–99. Similar techniques are apparent to those of ordinary skill for other formats including MMBDYY, MMYYDD, YYDDMM, DDYYMM, YYMM and YYDDD.

The results of analyzing sample set 18 indicate which fields include or omit date information. Inconclusive results are resolved by repeating the examination with additional sample sets taken from different locations within the large database 12, e.g., the beginning, midpoints and ends of the database. Analysis stage 20 produces keywords or field identifiers, a list of field locations that contain dates, offsets and length information associated with the database and date entries, the exact format of the date fields and other pertinent information to carry out the date field identification process. The process is repeated for each of multiple database files contained in the computational system. Database files that do not contain dates are eliminated from further examination and analysis.

Keyword Generation

Figure 3:
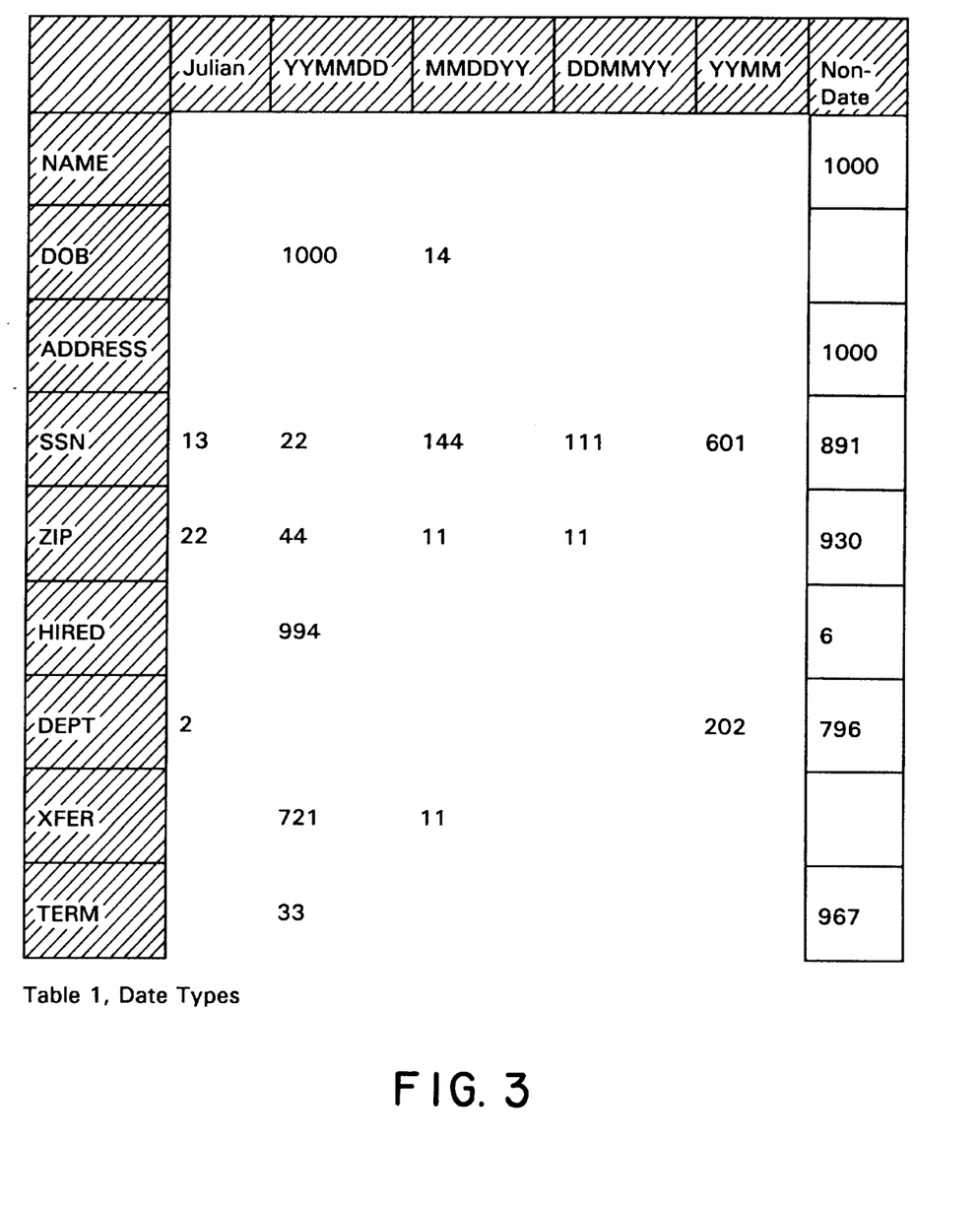
FIG. 3 shows another matrix that is generated in the database examination process showing a correlation of fields examined with known keywords that may indicate date fields.

A keyword list is built to determine all of the names by which the date fields may be known. They identify respective date entries, i.e., fields, in the records database 12 and PALM file 16. They are used to locate those instructions or modules of program 10 to be altered and/or modified. FIG. 3 depicts an exemplary matrix of keywords or field labels resulting from a typical database analysis as described in connection with stages 20 and 22 of FIG. 1. Names and aliases by which each date field is known are recorded in a list. These dates are the result of examining data division code for offset and length during the scanning process or by manually mapping from a data dictionary. The list is subsequently used to scan the actual source code of program 10.

The table of FIG. 3, for example, illustrates that DOB, HIRED and XFER are probably dates. Because some references to date fields may overlap, not all fields total 1000, that is, some total more than 1000. For example: 12/12/94 matches both MMDDYY and DDMMYY. Some fields, such as XFER, produce a high percentage of potential date-related data but also contain many records that do not fit in a date category. This may occur under circumstances when unused date records are carried as 00/00/00. For example, a field designed to display future dates, such as termination or transfer dates, will provide a preponderance of null-value records not shown as a date or a non-date. This anomaly can be eliminated by examining these fields closely or by providing another column in the matrix that indicates records with fields that contain inconclusive dates. When the sample produces results in which characters conform to a pattern of digits representing dates as two digit month, day, and year representations in any order that are close, but not equal to, 1000 hits, typographical and other input errors may account for the difference. Other insignificant levels of field hits, such as SSN or ZIP, are probably anomalies, consisting of numeric data that coincidentally falls into valid date patterns.

As shown in FIG. 3, most of the hits occur in certain fields. The names of these fields will be used to automatically search the code and to provide most of the field names for PALM file 16, i.e., the external file created to provide a database for expanded dates upon which calculations can be made without the need to internally expand date fields of the target system.

In addition to analyzing the database 12 to ascertain keywords, the source code is also analyzed or sampled to facilitate the process of identifying the dates and to determine other names, aliases, or re-definitions that have been used in relation to a date field. The examination process is confined to the data division, input/output, and working storage sections, or their equivalents, of each program module. All programs are processed to match the data layouts against known templates. Field locations that correspond to fields, previously determined to contain dates by the data sampling process, are identified and added to the list of keywords. Fields that overlap known date locations also are included in the list of keywords. The purpose of this exercise is to identify date fields in a file layout. Any resulting extraneous information will be treated as incidental, and may be reserved for further use for other projects.

Analysis of Program Modules

Figure 4:
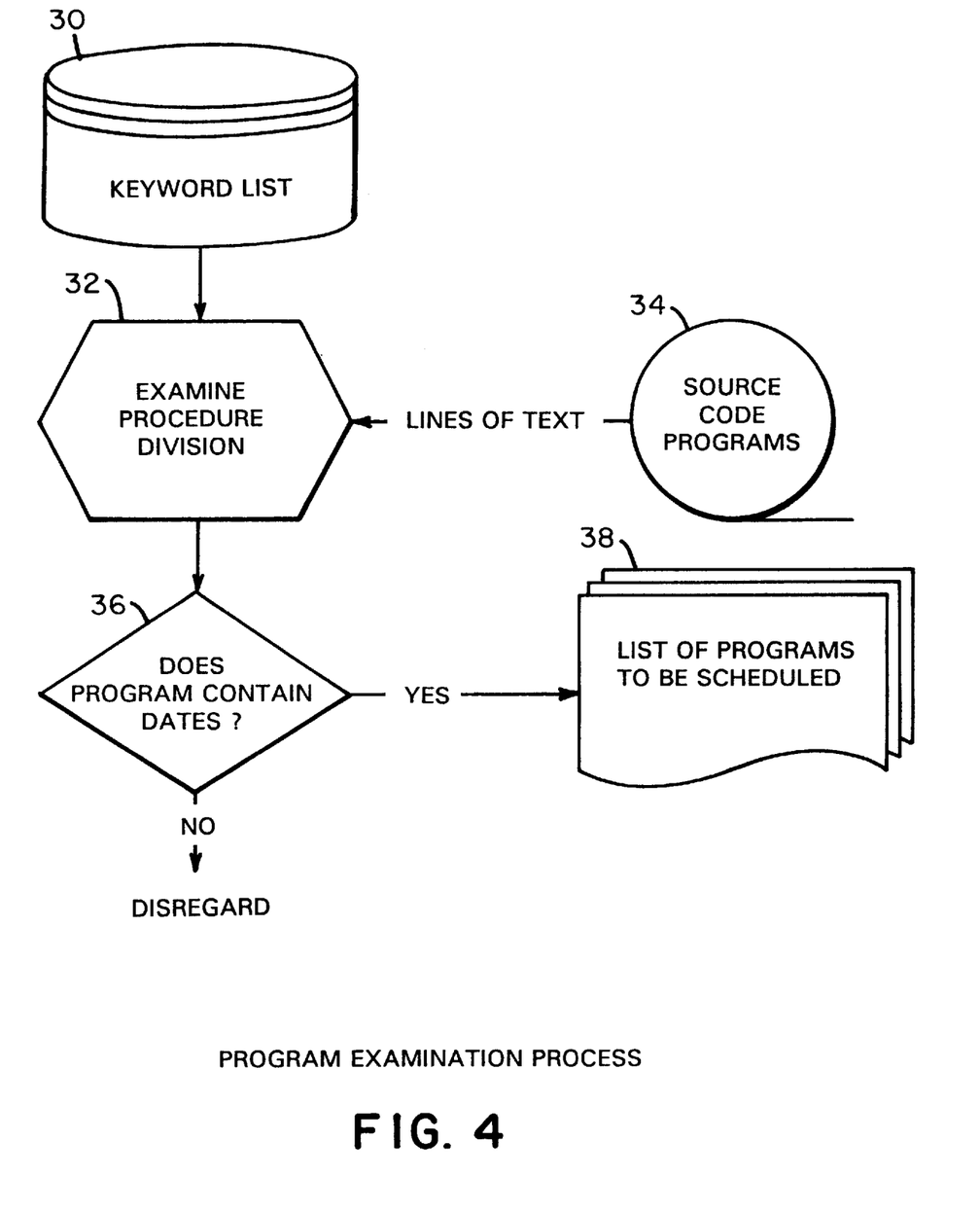
FIG. 4 is a flow diagram illustrating an exemplary processing scheme applied to computer source code to determine whether it contains or performs a processing step involving dates.

The source code modules of program 10 (FIG. 1) are analyzed at a code analysis stage 24 (FIG. 1) in order to isolate which modules require change-of-century modifications. As further illustrated in FIG. 4, source code 34 is analyzed line-by-line at stage 32 to detect inclusion of, or references, direct or indirect, to words that appear on the keyword file 30 previously derived from the database analysis. In addition, the source code is examined to detect references to date elements having pre-established formats. The procedure includes examining statements in a Procedure Division, for example, for words contained in the keyword file 30. Software analysis tools, such as text scanners and associated algorithms to detect predetermined formats, are used to implement this process. Moreover, the invention envisions employing various techniques to ensure identification of aliases and operations upon data constructs containing dates, as indicated at stage 36.

Locating dates in the source code is accomplished by searching for field names and by analyzing the characteristics of each field name to ensure that it is a valid date field. In addition to automated tools, the process is augmented by programmers who validate date fields based on various factors including whether a list of names identified as fields contain dates from the prior exercise, whether the words and phrases are commonly used to describe names, whether instructions detected are generally used to process or display dates such as PIC 9(6), and/or whether known dates are located in a data dictionary. Names in the Data Division do not always signify processing. The equivalent of COBOL's Procedure Division, for example, is examined for references to known date fields, as well as for group names containing dates, and macro verbs that accomplish many operations such as "CORRESPONDING." The presence of an instruction; "move DOB to TEMP," for instance, is sufficient to include the name TEMP on a keyword list.

This process is iteratively repeated until no further date-related instructions are detected. When a date-related name is located, the scanning tool adds it to the list for the next search. Illustrated date-related criteria include whether keywords match field names or aliases contain short dates; whether character strings frequently used to name dates such as: DATE, DOB, YR, YY, and MM are detected; whether intrinsic date fields are found to contain dates or are derived from dates; whether a renamed field originated from a date field; whether a match is found with a list of known date names; whether specific and limited aliases or regressed names are referenced; and whether data samples actually contain dates. If a program contains date-related information, it is flagged for modification. If a program is not found to be date-related, it is removed from further analysis.

Creation of the PALM File

The PALM file provides a repository for some or all of the date fields that are identified in database 12. It may be desirable to translate less than all abbreviated date fields from original database 12 to the PALM file to reduce the required labor. Translation may be limited to those date fields involved in computations, calculations, manipulations or processing of any kind or nature. Moreover, date fields may be translated regardless of whether they affect a result of processing after the year 2000. Generally, processing rules of the program 10 and/or user preferences dictate which of the date fields, if not all, are to be translated.

Unlike pure "expansion" techniques for attaining year 2000 compliancy, the PALM file advantageously enables continued use of original databases by undisturbed portions of the computational system. The newly created file is configured to hold the dates identified and extracted in analysis stages 20 and 24 (FIG. 1), and is used by those modules of program 10 requiring change-of-century modifications.

Figure 5:
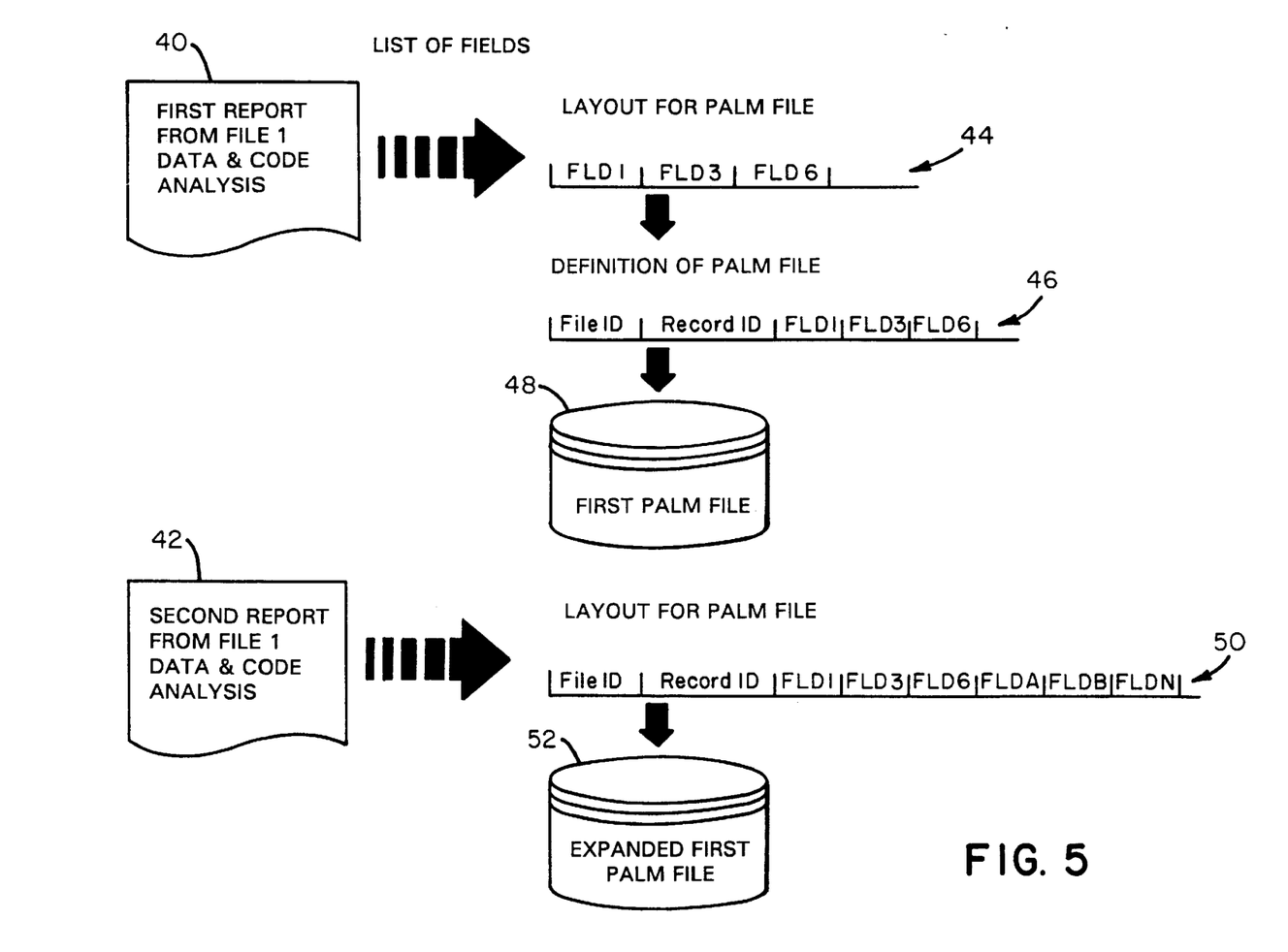
FIG. 5 illustrates how PALM files are created and how their records are constructed.

The PALM record layout comprises a field to identify the logical file, a field to locate the record, and a series of compliant dates. Referring to FIG. 5 in particular, PALM file 52 is derived from analyzing the database and programs, as discussed above, to derive the keyword list that identifies date fields. The PALM file database 52 includes an exemplary record 50 containing expanded date elements corresponding to abbreviated date elements of records of original database 12. "PALM" record 50 includes record identification information that is associated with corresponding records of the original database 12, as well as field identification information that is associated with the respective field of the PALM record. It also includes expanded date fields. Because development of the PALM file may be an iterative process, a first PALM file 48 might be generated based on a first analysis and report 40 that preliminarily characterizes date field locations and/or the keyword definitions as indicated by FLD1, FLD3, FLD6, etc. at 44. Respective field elements of record 44 are correlated with an associated FileID of the original database 12 (FIG. 1). A RecordID in PALM record 46 may identify the associated record of original database 12 that relate to the contents of record 46. Subsequent iterations of the analysis process reflected in report 42 provides a further developed PALM file 52 that additionally includes field elements FLDA, FLDB, FLDN, etc.

Several rules are used to generate PALM files. Preferably, a PALM file has a logical file structure. One PALM record corresponds to a record having a date entry in original database 12. Thus, the physical characteristics of the PALM files are as diverse as the target systems. No single formula is used to generate PALM files. For these reasons, in a highly integrated modular system, one physical PALM file may contain several logical files, each of which serve different portions of related functions. In DBMS environments, a logical table of records associated with an application may be created rather than distinct PALM files. In simpler systems, a more direct relationship will exist between PALM file descriptions and the files containing the original dates. Where the logical and physical file layouts coincide there may be a one-for-one relationship.

The same methods and conventions used to create records in the original database file 12 are used to create an associated PALM file. For example, if the original record is located by using an account number, the PALM record uses the same account number as the locating field. Also, if the original record was located by using a Social Security Number (SSN), the PALM record is identified by the same SSN. Similarly, if the original database file used a combination of fields such as account number/SSN number combinations, the PALM record uses the same fields.

Typically, the file identification scheme is established during the analysis process to coincide with the identification scheme of the original system. The PALM files might have a 12-character file identification field, such as SALES-MASTER and CUSTOMERS. Thus, the file identifier in the PALM records would start with the key SALES-MASTER or CUSTOMERS corresponding to the dates in the subsequent fields. When installations refer to files by a coded scheme that does not change, such as M00401 and SS223, the same code scheme will be used.

The record identification is indexed, or inverted, and corresponds to the locating keys in the record supported by the PALM file. This is one of the rare instances in which fields are redefined to identify closely related logical records that use separate keys.

A series of date fields are laid out in the PALM file in the same order they are discovered, with dates from each file grouped together. Date fields are not re-used. They are dedicated to the original date they represent. For example, in a PALM file that contains several logical files, there will be large empty spaces (nulls) which generally are compressed by most storage methods that pack large gaps down to a few characters. File definitions may be provided for each logical record to reduce the number of extraneous fields exposed to the programs that are modified.

PALM fields are named identically to fields of the original database. When multiple names have been allowed for the same field, the most appropriate single set of names is selected. Alternative field names will be accommodated by redefinitions or aliases supported by the file storage, Data Dictionary, and programming languages being used. This allows the patched routines to retain the same names used by the original program, qualified as to the file.

Qualification, and not prefixing or suffixing, is used to provide unique names when referring to PALM file date fields. The introduction of code copies with duplicate names may require qualification to be added to existing code. This is a small sacrifice for the order and control provided by using the proper nomenclature from the outset.

PALM file definitions are created through the data and code analysis process conducted during the project's analysis phase in accordance with the invention. When a file is identified as containing dates, the data definition process begins by laying out the File ID field, Record ID field(s), and space for each date located. When the analysis is completed, an empty construct is made to hold dates for the testing and developing of algorithms. Discovery of more dates and other file types is accommodated by modifying the data definition and replacing the PALM file with the new expanded PALM file.

For each software conversion project, support routines are developed for locating PALM records for processing and updating. PALM file processing is performed in a common I/O area or record buffers. INSITU logic established that the space for the record is reserved and processed. If the record is located, it is changed. If the record is not located (new), the area is blank and is changed. In either case, the record is either written or rewritten.

To update PALM records, PALM file logical record descriptions are copied from a library maintained for the project into the Data Division in appropriate places. PALM file access routines are inserted after the code locating the original file records, using the file ID combined with the fields used to identify the record. Date processing routines are extracted into subroutines, reworked to use PALM file dates, and called or inserted after the original routines. The original program reads a record, processes a date, and writes a record. The modified program reads a record, processes a date, writes a record, reads a PALM, processes a PALM, and writes a PALM.

To refine the software conversion process, business rules are examined and analyzed to determine the rules that govern how the date fields are to be used or analyzed. This process includes the tasks of 1) analyzing the target system's existing business rules to identify specific rules that determine how the date fields are constructed, 2) developing new business rules in the event that inadequate rules, or no rules, were used to build the original date fields, and 3) implementing the new business rules according to the present methodology.

Before algorithms can be built for the new date fields, the rules that govern processing the current date fields must be analyzed. It is inevitable that problems related to processing current date fields will occur during the course of this project. By examining the target system's business rules, a foundation is provided in advance for responding to these problems in the event they should arise. Moreover, the examination of the business rules facilitates the resolution process and prevents some problems caused by conflicting rules. For example, in one location, a rule may indicate that "any year greater than 45 is assumed to have century 20." In another location, a rule may indicate that "years less than 50 are assumed to be in the 20th Century." Note that the 20th century has a century of 19. These two rules provide conflicting information for the five years between 45 and 50.

Final Testing and Debugging

Figure 6:
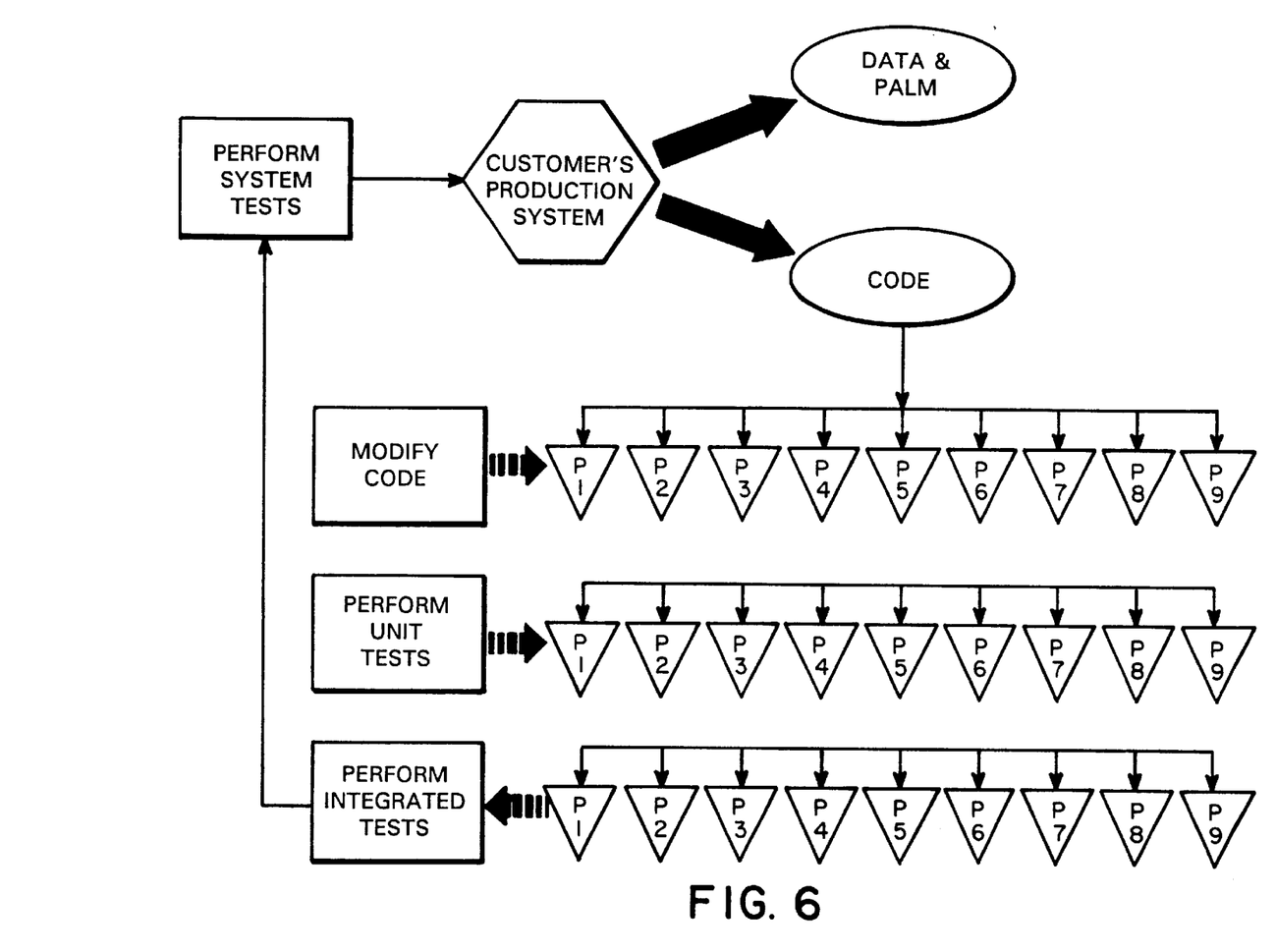
FIG. 6 illustrates the testing and quality assurance stage that may be employed after processing or converting a computer program to attain year 2000 compliancy.

In a final phase of the invention, the original program is modified to implement date-related changes and tested to ensure its integrity, as indicated in FIG. 6. In the code modification process, the original database is left intact and unmodified. Copies of programs and databases are provided to a project team for modification and testing. When all modifications have been implemented and the code has been tested, the revised copies are integrated with unmodified portions of the programs for installation and operation in the computational system.

The system and processes described typify an exemplary embodiment. Also, the order of implementation and/or the extent of iteration may be varied in practicing the teachings hereof. Although fully automated procedures are preferred, the extent of performance of other steps analytically may also vary. Accordingly, it is intended that the claims rather than the described embodiments provide guidance as to the claimed subject matter and that the description herein embrace those teachings that may also come to those skilled in the art.

I claim:

1. A computer-implemented method of processing a computational system to attain year 2000 compliancy during subsequent execution thereof wherein the system includes a program and a database which includes abbreviated representations of dates that are accessed by said program, said method comprising:

examining the database to ascertain the presence and location of abbreviated representations of dates;

based on results of said examining, creating an auxiliary file that includes expanded representations of dates and cross-reference tags that said expanded representations of dates with respective associated abbreviated representations of dates located in said database wherein, in the case of ambiguity, the determination of the century of said expanded representation of dates is predicated on given rules for expansion; and modifying certain instructions of said program that reference abbreviated representations of dates in said database to effect reference to corresponding expanded representations of dates in said auxiliary file in accordance with said cross-reference tags while other instructions of said program continue to access said original database file whereby to remove processing ambiguities involving date representations during execution of said program and to enable continued use of said database with respect to other database information.

2. A year 2000 compliant computational system comprising a modified program, a database and an auxiliary file wherein said database includes multiple records having record IDs and date fields with abbreviated date information, said auxiliary file also including multiple records having record IDs that correspond with record IDs of said database and at least one field having fully expanded date information indicative of corresponding abbreviated date information in said database wherein, in the case of ambiguity, the century of said fully expanded date information was predicated on given rules for expansion, and said modified program includes database reference instructions that have been modified to obtain information from said auxiliary file in accordance with record IDs of said database and said auxiliary file.

3. A computer-implemented method of processing a computational system to attain year 2000 compliancy wherein the system includes an original program and an original database having database records with fields containing abbreviated representations of dates, said method comprising:

examining the fields of the original database records to ascertain the presence and location of fields containing abbreviated representations of dates;

generating record identification information associated with records of said original database having abbreviated representation of dates and position information indicative of positions within said records of abbreviated representations of dates;

based on results of said examining and said generating, creating an auxiliary file that includes auxiliary records having expanded date fields that contain expanded representations of the dates corresponding to abbreviated representations of dates in the original database wherein, in the case of ambiguity, the determination of the century of said expanded representation of dates is predicated on given rules for expansion, said auxiliary records having record identification information associated with corresponding records of the original database;

developing a keyword file containing keywords indicative of elements in said original program that refer to dates;

examining said original program to detect the presence or absence of said keywords in respective modules thereof; and modifying those modules of said original program in which a keyword is detected so that instructions thereof that referenced said original database for abbreviated representations of dates are altered to effect reference to corresponding expanded representations of dates in said auxiliary file.

4. A computer-implemented method of converting a database and a computer program to achieve year 2000 compliancy comprising the steps of:

examining an original database to ascertain date field identifying information and to locate the position of fields within records of said database containing date information;

analyzing source code of said computer program to locate instructions thereof that process date information;

creating an external file containing fully expanded date representations that correspond to abbreviated date representations of said original database wherein, in the case of ambiguity, the determination of the century of expanded date representation is predicated on given rules for expansion; and modifying certain instructions of said computer program that process date information in said database to refer to said external file for accesses to fully expanded date representations.

5. The computer-implemented method as recited in claim 1, 3 or 4 wherein said examining step is performed by comparing entries in fields of said database records with known date formats and determining whether said field is a date field based on whether the contents of examined fields match known date formats.

6. The computer-implemented method as recited in claim 5 wherein said examining step is performed with respect to at least m sample sets of n records of said database wherein sample sets are drawn from different locations of said database.

7. The computer-implemented method as recited in claim 3 wherein n and m are greater than one.

8. The computer-implemented method as recited in claim 4 wherein said analyzing step is performed by scanning the source code of said program for the presence of keywords indicative of dates and isolating modules of said source code to be used in said modifying step.

9. The computer-implemented method as recited in claim 8 wherein said keywords used during scanning are derived from at least one of said database, a dictionary defining date fields and constructs of said source code.

10. The computer-implemented method as recited in claim 9 wherein said examining is performed iteratively upon said source code until the incidences of newly discovered keywords are reduced to a minimum.

11. A computer-implemented method of processing records of a database to locate and identify date fields within said records based on a statistical sampling of a sample of records of said database wherein said date fields have at least one of the formats YYMMDD, YYDDMM, MMDDYY, MMYYDD, DDMMYY and DDYYMM, said method comprising the steps of:

scanning said sample to locate at least one of the formats having two-digit month fields having numbers from the set 01–12, and two-digit day fields having numbers from the set 01–31 for month field values of 01, 03, 05, 07, 08, 10, and 12;

01–30 for month field values of 04, 06, 09, and 11;

01–29 for month field values of 02 for a leap year; or

01–28 for month field values of 02 for a non-leap year; and two-digit year fields having numbers from the set 01–99;

determining the position and the format of date fields within the records of said sample; and generating an auxiliary file indicative of expanded representations of date fields of said original database according to the position and format of date fields of said sample determined in said determining steps wherein, in the case of ambiguity, the determination of the century within said expanded representation of date fields is predicated on predetermined rules for expansion.

12. A computer-implemented method of processing multiple records of a large database based on statistical sampling of a portion of records thereof in order to locate and identify date fields having an abbreviated YYMM format, said method comprising the steps of scanning said portion of records to detect the presence of two-digit month fields having numbers from the set 01–12 and two-digit year fields preceding the month field having numbers from the set 01–99, determining the position of at least one date field within records of said portion, and generating an auxiliary file including indications of expanded representations of date fields that correspond to date fields within records of said large database based on the position of date fields within records of said portion determined in said determining step.

13. The method as recited in claim 12 wherein said indications are pointers.

14. A computer-implemented method of processing multiple records of a large database based on statistical sampling of a portion of records thereof in order to locate and identify date fields having at least one of abbreviated formats YYDDD and DDYY said comprising the steps of scanning said portion of records to detect the presence of three-digit day fields having numbers from the set including 01–365 for a non-leap year or 01–366 for a leap year, and two-digit year fields having numbers from the set 01–99; determining the position of at least one date field within records of said portion and generating an auxiliary file including indications of expanded representations of date fields that correspond to date fields within records of said large database based on the position of date fields within records of said portion determined in said determining step.

15. The method as recited in claim 13 wherein said indications are pointers.

16. A computer-implemented method for locating and identifying date fields having a predetermined format for use in a year 2000 compliant computational system that includes a large database containing date fields within records thereof, said method comprising the steps of scanning said database to locate date fields matching said predetermined format; generating a representation of a layout of possible date fields and the location thereof and determining whether said identified and located date fields contain date information based on the frequency said field matches said predetermined format.

17. A computer-implemented method for locating and identifying date fields having a predetermined format for use in a year 2000 compliant computational system that includes a large database containing date fields within records thereof, said method comprising the steps of:

scanning a sample set of records of said database to locate date fields matching said predetermined format:

determining the format and position of date fields within records of said sample set; and based on said the format and position resulting from said determining step, generating a file indicative of record numbers, date field format and position within records of date fields of said large database.

* * * * *